: 3,709,875
METHOD OF PREPARING DEXTRAN AND DEXTRAN COMPOUNDS SOLUBLE IN COLD WATER
Henry Marinus Christensen, Frederiksborgvej 107, Roskilde, Denmark
No Drawing. Filed Nov. 3, 1969, Ser. No. 873,681
Claims priority, application Denmark, Nov. 1, 1968, 5,323
Int. Cl. C08b 3/00
U.S. Cl. 260—209 D        7 Claims

ABSTRACT OF THE DISCLOSURE

Dextrans and dextran derivatives which are readily soluble in cold water are produced by adding a sirupy alcohol- or ketone-water mixture of dextran or a dextran derivative to a highly concentrated alcohol or ketone to produce a granular precipitate which is washed with the respective concentrated alcohol or ketone.

---

For several years it has been known especially in the field of medical therapy to use aqueous solutions of dextran material with a wide variety of molecular sizes.

The starting material for the production of these solutions have been highly purified, depolymerized dextran or e.g. an alcohol compound of dextran as, for instance, dextran glycerol glycoside.

For many years dextrans and dextran compounds which are only slightly or sparingly soluble even at boiling temperature have been used. Such dextrans and dextran compounds were produced by first preparing a high molecular starting material which thereafter was depolymerized in a known way. The resulting product was purified and fractionated through repeated precipitation, mainly with ethanol, combined with dialysis subsequently by a treatment with ion exchange agents whereafter final precipitation with alcohol yielded a sirupy mass which, after drying in a dryer, if desired, under vacuum, was ground.

Lately the demands with repect to the quality of dextrans and especially to their solubility have increased very considerably requiring that a usable and saleable dextran should form a clear solution in cold water. This demand has resulted in a change in the last step of producing a pure, dry dextran.

The only method known until now for producing dextrans which are readily soluble in cold water consists in completing the manufacturing process with a spray-drying process, e.g., a Niro-atomizer system by which a very lightweight and readily soluble dextran or dextran glycerol glycoside is produced.

This method however, is connected with certain increases in costs and inconveniences because (1) A very expensive equipment is required,
(2) Thus increasing the production costs, and,
(3) At the same time prolonging the manufacturing time required,
(4) Moreover, the risk of contamination with pyrogenic materials is increased, and,
(5) Finally, relatively large losses in the final process manufacturing step are encountered.

The method according to the present invention eliminates all the mentioned disadvantages.

This method is characterized by the feature that a syruplike, pure dextran or dextran glycoside is produced by a final precipitation step during purification. Such precipitation is effected by adjusting the alcohol concentration to about 50–65%, if ethanol is used as precipitating agent.

It should be noted that, where an alcohol percentage is mentioned hereinafter, the Tralles percentage by volume at 15° C. for ethanol is indicated.

When employing other alcohols or ketones as precipitating agents the required concentration is calculated beforehand by empirically determining the precipitating effect of said other compounds relative to the precipitating effect of ethanol.

Further treatment of the precipitated material is carried out as follows:

The syruplike dextran material in a mixture of alcohol and water is transferred to a screen from which it is allowed to run down in squirts into a strongly concentrated or substantially water-free alcohol or ketone, which is vigorously stirred, if desired, by means of a suitable stirrer or disintegrator. Thereby the squirts are smashed and quick drying of the dextran material due to the concentrated organic liquid has the effect that the dextran material is converted into small semi-dry particles which are kept suspended in the organic liquid during stirring.

The concentration of the organic liquid in the suspension is controlled at the rate the dextran material is converted. As soon as a suitable quantity of dextran material is in suspension stirring is discontinued and the particles which can better be described as a granulate, will settle.

Most of the liquid is decanted from the solid material and is, thereafter, exchanged with new concentrated suspending agent while stirring of the granulate in the added liquid is repeated.

In this way the granulate is "washed," if desired, by repeatedly decanting and renewing the suspending agents until a concentration between 90.0% and 99.9%, by volume, has been achieved.

When this concentration is achieved, the granulate is in itself relatively "dry."

Stirring is continued and pyrogen-free re-distilled water is added causing the suspension to be washed down to an alcohol percentage between 80% and 92%. Stirring is then discontinued and the precipitate (the granulate) is freed as much as possible from the liquid, i.e., by transferring the mixture to a vacuum filter and subjecting the precipitate to filtration on a vacuum filter.

The semi-dry granulate is dried in a known way, if desired, in a vacuum.

The dried material is ground and is very readily soluble in cold water yielding a clear solution.

EXAMPLE 1

A 10% aqueous solution of highly purified dextran of an average molecular weight of 40,000 is precipitated by the addition of ethanol (92–96%) until a concentration of 59% of ethanol is achieved. Thereby a syruplike dextran is precipitated. It forms a half-floating layer at the bottom of the precipitation container.

The supernatant alcohol-water mixture is decanted quickly and carefully. Thereafter the precipitated half-floating dextran is passed through a riddle with 3 mm. holes into absolute alcohol with vigorous stirring, whereby the floating dextran is transformed into a "granulated" state.

The alcohol concentration in the mixing container is controlled during the addition of dextran. Its concentration should not decrease below 89%. The concentration is determined with a controlled alcoholometer and it is corrected for temperature.

About 260 liters of absolute alcohol are used for 50 kg. of precipitated dextran calculated as dry material.

As soon as the required quantity of dextran has been added, stirring is discontinued and the granulate precipitates whereafter the alcohol-water mixture is decanted off carefully and is substituted by fresh concentrated alcohol while stirring.

The resulting alcohol percentage is determined and, if required, washing with absolute alcohol is repeated as an alcohol percentage of 95% in the washing liquid is aimed at.

The dextran is now brought in hard granulated form with a particle size of about 2 mm. Stirring of the solution is continued whereafter pyrogen-free, ion-free water—about 20 liters to 30 liters—is added until an alcohol percentage of 89% has been achieved. The process is controlled very carefully and the water is added slowly.

The dextran does not change its granular form during this process. After stirring for 20–30 minutes, the dextran granulate is allowed to settle, and the liquid is decanted off and is filtered off by suction, whereafter the semi-dry granulate is transferred to a vacuum dryer. It is dried at 100° C. for 12 hours at atmospheric pressure, and thereafter in a vacuum at 60° C. The dry dextran product is ground in a hammer mill and is further dried.

All steps starting with the precipitation of the 10% solution and until the granulate in 89% alcohol is produced are carried out within a period of one hour.

The resulting dextran powder is easily soluble in cold water.

EXAMPLE 2

A 10% solution of highly purified dextran of an average molecular weight of 40,000 is precipitated by the addition of acetone until a concentration of 50% by volume, of acetone is obtained. Thereby a syruplike, dextran is precipitated forming a half-floating layer at the bottom of the precipitation container.

The supernatant acetone-water mixture is decanted quickly and carefully. Thereafter the precipitated half-floating dextran is passed through a riddle with 3 mm. holes into pure acetone under vigorous stirring, by which the floating dextran is transformed into a "granulated" state.

The acetone concentration in the mixing container is controlled during the addition of dextran. Its concentration should not be lower than 87% by volume.

About 275 liters of acetone are used for 50 kg. of precipitated dextran calculated as dry material.

As soon as the required quantity of dextran has been added, stirring is discontinued and the granulate is allowed to settle whereafter the acetone-water mixture is decanted carefully and is replaced by fresh concentrated acetone while stirring.

The resulting acetone concentration is controlled and washing with pure acetone is repeated, if required, until an acetone concentration of more than 95% by volume is obtained.

The dextran is now converted in a hard granulated form with a particle size of about 2 mm. Its suspension is stirred and pyrogen-free, ion free water—about 25 to 300 liters—is added until an acetone percentage of 87% has been achieved. The process is controlled very carefully and the water is added slowly.

The dextran does not change its granulated form during this process. After stirring for 20–30 minutes the dextran granulate is allowed to settle, and the liquid is decanted and is filtered off by suction, whereafter the semi-dry granulate is transferred to a vacuum dryer. It is dried at 100° C. for 12 hours at atmospheric pressure and thereafter in a vacuum at 60° C. The resulting dry dextran is ground in a hammer mill and is further dried.

All the process steps from the precipitation step of the 10% solution up to the granulation step of producing the granulate in 87% acetone are carried out within a period of one hour.

The resulting dextran powder is readily soluble in cold water.

EXAMPLE 3

The procedure is exactly the same as described in Example 1 or 2 with the only difference that the starting material is precipitated by the addition of ethanol to yield the half-floating dextran.

Further treatment of said dextran to yield a cold water soluble product is carried out with ethanol as described in Example 1.

EXAMPLE 4

The procedure is exactly the same as in Example 1 only with the difference that the starting material is precipitated with methanol to yield the half-floating dextran.

What is claimed is:

1. In a process of improving the solubility in cold water of a dextran compound selected from the group of a dextran and a dextran glycerol glycoside, said dextran compound having an average molecular weight between about 3000 and about 100,000, the steps which consist in
    (a) adding a syrup-like mixture of a dextran compound, water, and a dextran precipitating solvent selected from the group consisting of a water-soluble lower alkanol and a water-soluble lower alkanone in several small streams to such a dextran precipitating solvent of a higher solvent concentration than that of the mixture of water and the dextran precipitating solvent present in said starting syrup-like mixture, while stirring vigorously, thereby increasing the concentration of said dextran precipitating solvent at least to about 87%,
    (b) allowing the resulting granular precipitate of dextran compound to settle,
    (c) separating the supernatant solvent from said granular dextran compound,
    (d) replacing the separated solvent by and suspending the dextran compound in a fresh dextran precipitating solvent of high concentration, while stirring, thereby increasing the concentration of the suspending solvent to at least 90%,
    (e) adding to the resulting suspension water while stirring until the concentration of the suspending solvent is reduced to a concentration not lower than 80% but lower than its concentration in step (d),
    (f) removing the solvent from the resulting granular dextran compound, and
    (g) drying the dextran compound.

2. The process of claim 1, in which in step (a) the syrup-like mixture of dextran compound, water, and dextran precipitating solvent is introduced into the precipitating solvent of higher concentration by passing it through a riddle to produce thereby several small streams of said syrup-like mixture.

3. The process of claim 1, in which the dextran precipitating solvent is selected from the group consisting of methanol, ethanol, and acetone.

4. The process of claim 3, in which the dextran precipitating solvent is ethanol.

5. The process of claim 1 in which ethanol is used as the dextran precipitating solvent, the concentration of said solvent in step (a) is increased to about 89%, the concentration of said solvent in step (d) is increased to about 95%, and the concentration of said solvent in step (e) is reduced by the addition of water to about 89%.

6. The process of claim 1, in which acetone is used as the dextran precipitating solvent, the concentration of said solvent in step (a) is increased to about 87%, the concentration of said solvent in step (d) is increased to about 95%, and the concentration of said solvent in step (e) is reduced by the addition of water to about 87%.

7. The process of claim 1, in which the syrup-like mixture of a dextran compound, a dextran precipitating solvent, and water is a mixture containing between about 50% and about 65% of the dextran precipitating solvent.

References Cited

UNITED STATES PATENTS

| | | | |
|---|---|---|---|
| 2,644,815 | 7/1953 | Gronwall et al. | 260—209 D |
| 2,784,143 | 3/1957 | Wieman | 260—209 D |
| 2,856,398 | 10/1958 | Novak | 260—209 D |
| 2,914,414 | 11/1959 | Novak et al. | 260—209 D |

LEWIS GOTTS, Primary Examiner

J. R. BROWN, Assistant Examiner